R. D. HEATH.
PNEUMATIC BRAKE FOR VEHICLES.
APPLICATION FILED JAN. 24, 1921.
1,416,822. Patented May 23, 1922.
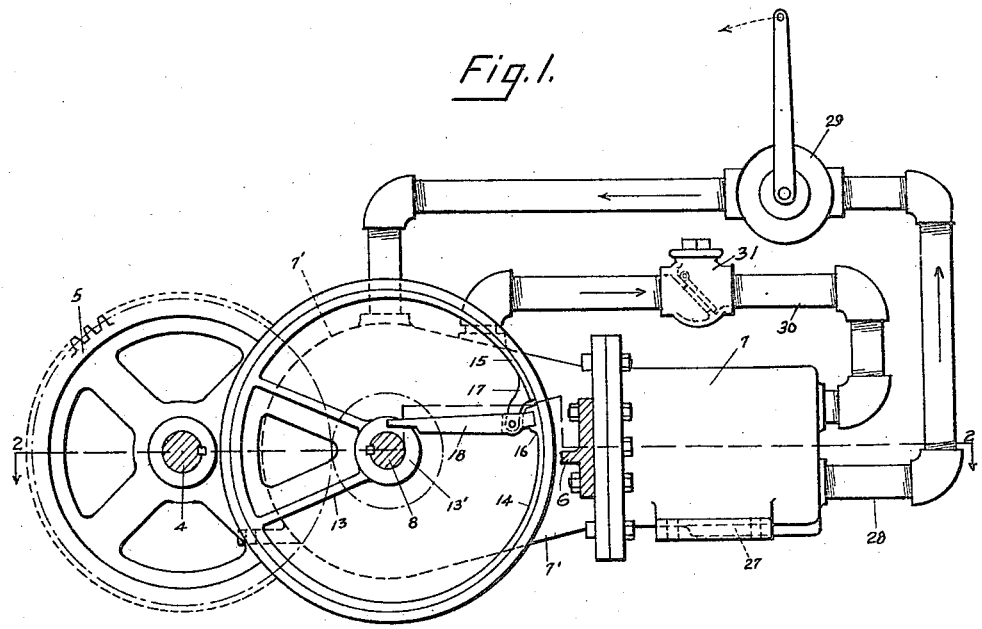
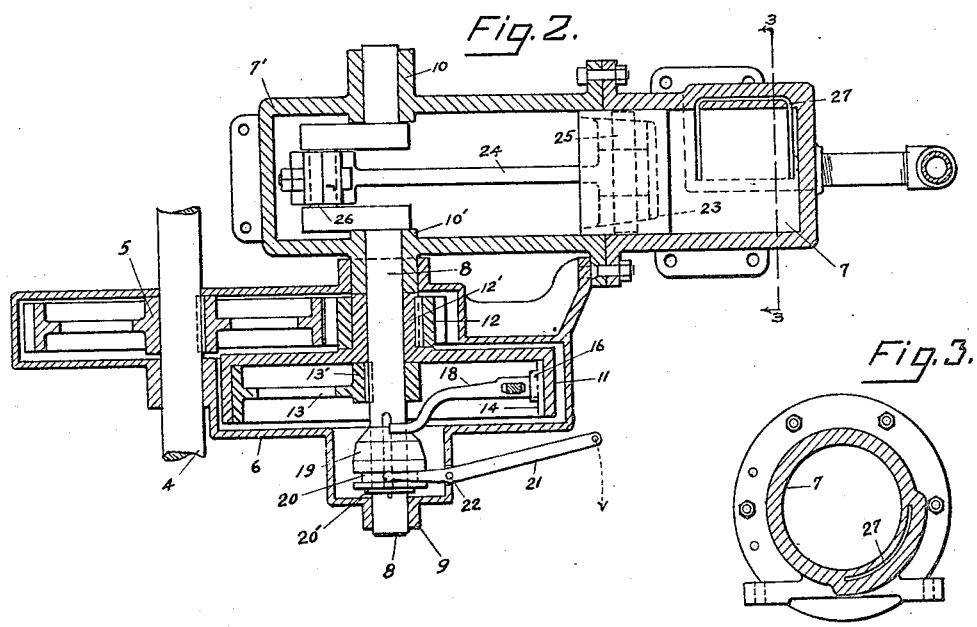
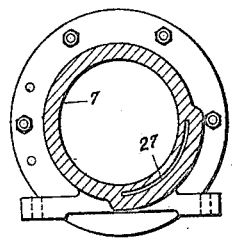
INVENTOR:
RALPH D. HEATH.
BY R. C. Wright,
ATTY.

UNITED STATES PATENT OFFICE.

RALPH D. HEATH, OF PORTLAND, OREGON, ASSIGNOR OF ONE-HALF TO JOHN RING, OF PORTLAND, OREGON.

PNEUMATIC BRAKE FOR VEHICLES.

1,416,822.  Specification of Letters Patent.  Patented May 23, 1922.

Application filed January 24, 1921. Serial No. 439,582.

*To all whom it may concern:*

Be it known that I, RALPH D. HEATH, a citizen of the United States, residing at Portland, in the county of Multnomah and State of Oregon, have invented a new and useful Improvement in Pneumatic Brakes for Vehicles, of which the following is a specification, reference being had to the accompanying drawings.

My invention relates to braking devices as a class.

The object of my invention is to provide a device adapted particularly as a pneumatically operated brake mechanism for the common type of motor vehicles. It may however be applied to other types of vehicles, and to machinery of various kinds, in connection with which a brake mechanism is desired. These objects, as well as other advantages, I attain by the construction, combination and arrangement of parts shown in the accompanying drawings which form a part hereof.

Fig. 1 is a side elevation of the device in connection with a power shaft, the gear housing being broken away, Fig. 2 is a sectional plan view of the device on the line 2—2 in Fig. 1.

Fig. 3 is a view partly in section on the line 3—3 in Fig. 2.

Like characters refer to like parts in the views.

A power shaft 4 is shown. This power shaft is of any type desired to conveniently transmit power from a source thereof to mechanism to be operated by it. A toothed wheel 5 is rigidly secured on the shaft 4. A rigidly secured casing 6 extends about a wheel 5 and other mechanism hereafter to be described. The shaft 4 extends through this casing and is rotatable in bearings in the walls thereof. A cylinder 7 is rigidly secured adjacent to and in a parallel direction with the casing 6. The cylinder 7 has a crank casing 7′ rigidly secured to it and extending from it, adjacent to and parallel with the casing 6. A crank shaft 8 is arranged parallel with the shaft 4 and extends through the casing 6 into the crank case 7′. A passage is formed between the casing 6 and crank case 7′. The crank shaft 8 is rotatably mounted in bearing 9 of the casing 6 and bearings 10 and 10′ of the crank casing. A friction clutch housing 11 is rotatably mounted on the shaft 8 within the casing 6. A toothed wheel 12, of a diameter in related proportion to the diameter of the wheel 5, is rigidly secured about and to the hub 12′, extending centrally from the housing 11, and meshes with the wheel 5. Within the housing 11 is a triangular spoke 13 having a hub 13′ rigidly keyed upon the shaft 8, the spoke extending to a segmentary sliding engagement with the inner surface of the housing rim. Friction bands 14 and 15 are each secured at one end thereof to opposing sides of the spoke 13 and extend therefrom along the inner surface of the housing rim toward a meeting point of their opposite free ends. The band 14 has a recessed lug 16 on its free end. The band 15 has a fulcrum bracket 17 on its free end. An angled arm 18 is pivoted near one end on the fulcrum bracket 17. The shorter part of the arm extends into the recess of the lug 16. The opposite free end of the arm is curved and extends partly over the shaft 8. Adjacent to the housing 11 a double conical sleeve 19 is slidably arranged on the shaft 8. The inner part of the sleeve 19 has a desired conical form, and near its outward part is provided with a circular groove 20. A collar 20′ prevents the sleeve from sliding beyond a desired distance toward the end of the shaft. A lever 21 extends from without into the casing 6, being pivoted in the wall thereof on the pivot 22. The inner end of the lever 21 extends into the sleeve groove 20, in a manner allowing it to engage and slide the sleeve on its shaft into engagement with the arm 18 and cause said arm to slide on the conical surface and move on its fulcrum in a manner to spread the free ends of the bands 14 and 15 apart and force the bands into frictional engagement with the inner surface of their housing rim.

Within the cylinder 7 a piston 23 is arranged. A connecting rod 24 is mounted at one end within the piston on a wrist pin 25, and its opposite end is mounted on a crank pin 26 in the opposing part of the crank shaft 8. The cylinder 7 has a by-pass 27. A pipe 28 extends from a port in the end of the cylinder above the by-pass to a port rearwardly thereof in the crank case, and is provided with a throttle 29 therein. A second pipe 30 extends from a port in the end of the cylinder above that of the pipe 28 to a port in the crank case rearwardly of the piston, and has a check valve 31 therein, opening forwardly.

It will now be seen that the device may be secured about and in connection with the driving shaft of a desired mechanism. If the throttle is wholly and suddenly closed, as shown in Fig. 1, and if the friction bands were forced to their greatest tension and engagement, the drive shaft would be locked at once. For a proper neutral position the throttle would be wide open, and in such position the air in the cylinder and crank case is neutral and the piston, if in stroke, would move freely without compression. When the clutch is not thrown in, the gear wheels rotate on the housing 11 about the spoke 13 and bands 14 and 15, without rotating the shaft 8. Upon drawing the lever 21 the conical sleeve 19 moves the end of the arm 18 upwardly on an incline, which causes the opposing end of the arm, moving on its fulcrum, to spread the bands into frictional engagement with the inner surface of their housing rim, and acts as a clutch to include the shaft 8 on a line of power transmission through the housing 11. This in turn causes the shaft 8 to move the piston 23 in its strokes. When the mechanism is thus placed in operation by the lever 21, the throttle 29 is closed to a desired extent, and the air forwardly of the piston is confined there in the quantity required and cannot pass rearwardly through the pipe 30 because of its check valve. As the piston moves on its rear stroke, the air is forced forwardly again through the pipe 30 and is prevented from returning by the check valve. It will thus be seen that the air cushion ahead of the piston tends to retard its strokes, which in turn retards the rotation of the drive shaft, through the intervening locked mechanism, and the speed of the drive shaft is decreased as desired.

It will further be seen that when the piston reaches its stroke limit, and has passed the inner opening of the by-pass, the air in the forward part of the cylinder exhausts to the rear through the by-pass and prevents a compression which might otherwise drive out the cylinder head. The by-pass also has the important function, that, as the air exhausts through it rearwardly of the piston, and the by-pass again is closed by the beginning of the reverse piston stroke, a partial vacuum is created forward, and the air to the rear is easily driven through the pipe 30 and the suction of the piston draws it in ahead again for the next stroke on compression. By releasing the lever 21, and opening the throttle, the mechanism is returned to neutral position instantaneously. The minimum number of parts and the simplicity of construction shown in my device supply a pneumatic brake for a drive shaft, of great power and quick operation. The device is also economical to manufacture, install and operate. It may be used under any conditions where it is desired as a brake to retard or stop a drive shaft. The gearing between the shafts is so related that a desired speed of the crank shaft may be obtained. The operating lever 21 allows the clutch mechanism to be quickly placed in operative position and the throttle controls the quantity of air desired for compression in the cylinder. The piston will of course move in a neutral atmosphere as long as the throttle is opened. The by-pass is a safety feature, and provides means to obviate too great an amount of air in the cylinder at the end of the piston stroke, when the clutch is first operated and the drive shaft is rotating with considerable speed.

I claim—

1. A braking device for a power shaft, having in combination therein, a united cylinder and crank case, a pipe extending from a port in the cylinder to one in the crank case, and provided with a throttle therein, a second pipe extending from and to similar ports, and provided with a check valve therein opening forwardly, a piston slidable in the cylinder, and a crank shaft transversely in the crank case, provided with a connecting rod mounted at one end on the crank pin, its opposite end being mounted on a wrist pin of the piston.

2. A braking device for a power shaft, having in combination therein, a united cylinder and crank case, the cylinder having a by-pass, a pipe extending from a port in the cylinder to one in the crank case, and provided with a throttle therein, a second pipe extending from and to similar ports, and provided with a check valve therein opening forwardly, a piston slidable in the cylinder to a position forwardly of the inner end of the by-pass, and a crank shaft transversely in the crank case, provided with a connecting rod mounted at one end on the crank pin, its opposite end being mounted on a wrist pin of the piston.

3. A braking device for a power shaft, having in combination therein, a united cylinder and crank case, a pipe extending from a port in the cylinder to one in the crank case, and provided with a throttle therein, a second pipe extending from and to similar ports, and provided with a check valve therein opening forwardly, a piston slidable in the cylinder, a crank shaft transversely in the crank case, provided with a connecting rod mounted at one end on the crank pin, its opposite end being mounted on a wrist pin of the piston, and clutch mechanism arranged adjacent to the crank case about the outer end of the crank shaft in a manner to allow it to be manipulated and locked upon said shaft, 4. A braking device for a power shaft, having in combination therein, a united cylinder and crank case, a pipe extending from a port in the cylinder to one in the crank case, and provided with a throttle therein, a second pipe extending from and to similar ports, and provided with a check valve therein opening forwardly, a piston slidable in the cylinder, a crank shaft transversely in the crank case, provided with a connecting rod mounted at one end on the crank pin, its opposite ends being mounted on a wrist pin of the piston, clutch mechanism arranged adjacent to the crank case about the outer end of the crank shaft in a manner to allow it to be manipulated and locked upon said shaft, a drive shaft, and intervening mechanism arranged to transmit power in a related proportion to and through the clutch mechanism to the crank shaft.

RALPH D. HEATH.

Witnesses:
C. H. THOMPSON,
JULIA BULLARD.